United States Patent
Rosoff et al.

(10) Patent No.: US 11,816,497 B2
(45) Date of Patent: Nov. 14, 2023

(54) CONTAINER ORCHESTRATION IN A CLUSTERED AND VIRTUALIZED COMPUTER SYSTEM

(71) Applicant: VMware, Inc., Palo Alto, CA (US)

(72) Inventors: Jared Sean Rosoff, Palo Alto, CA (US); Mark Russell Johnson, McKinleyville, CA (US); Adrian Drzewiecki, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 5 days.

(21) Appl. No.: 16/838,690

(22) Filed: Apr. 2, 2020

(65) Prior Publication Data

US 2021/0311764 A1     Oct. 7, 2021

(51) Int. Cl.
| | |
|---|---|
| *G06F 9/455* | (2018.01) |
| *G06F 9/445* | (2018.01) |
| *G06F 9/54* | (2006.01) |
| *G06F 9/48* | (2006.01) |

(52) U.S. Cl.
CPC ...... *G06F 9/45558* (2013.01); *G06F 9/44505* (2013.01); *G06F 9/45545* (2013.01); *G06F 9/4881* (2013.01); *G06F 9/54* (2013.01); *G06F 2009/4557* (2013.01); *G06F 2009/45595* (2013.01)

(58) Field of Classification Search
CPC ............. G06F 9/45558; G06F 9/44505; G06F 9/4881; G06F 9/45545; G06F 9/54; G06F 2009/45595; G06F 2009/4557
See application file for complete search history.

(56) References Cited

U.S. PATENT DOCUMENTS

| | | | |
|---|---|---|---|
| 10,191,778 B1* | 1/2019 | Yang | G06Q 30/0283 |
| 10,762,049 B1* | 9/2020 | Liang | G06F 11/323 |
| 2017/0371693 A1 | 12/2017 | Corrie et al. | |
| 2018/0324204 A1* | 11/2018 | McClory | G06F 11/3684 |
| 2020/0356397 A1* | 11/2020 | Kumatagi | G06F 9/455 |

OTHER PUBLICATIONS

Ernst, E. et al. "Kata Containers Architecture," GitHub, Inc., 2019, 22 pages, URL: https://github.com/kata-containers/documentation/blob/master/design/architecture.md.
Vmware, Inc. "Overview of vSphere Integrated Containers," Product version: 1.5, 2019, 21 pages.
U.S. Appl. No. 16/751,529, filed Jan. 24, 2020, 48 pages.

* cited by examiner

*Primary Examiner* — Dong U Kim
(74) *Attorney, Agent, or Firm* — Kim & Stewart LLP

(57) ABSTRACT

An example virtualized computing system includes a host cluster having a virtualization layer directly executing on hardware platforms of hosts, the virtualization layer supporting execution of virtual machines (VMs), the VMs including pod VMs, the pod VMs including container engines supporting execution of containers in the pod VMs; an orchestration control plane integrated with the virtualization layer, the orchestration control plane including a master server and pod VM controllers, the pod VM controllers executing in the virtualization layer external to the VMs, the pod VM controllers configured as agents of the master server to manage the pod VMs; pod VM agents, executing in the pod VMs, configured as agents of the pod VM controllers to manage the containers executing in the pod VMs.

20 Claims, 14 Drawing Sheets

CONTAINER ORCHESTRATION IN A CLUSTERED AND VIRTUALIZED COMPUTER SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into a logical unit called a "pod." Containers in the same pod share the same resources and network and maintain a degree of isolation from containers in other pods. The pods are distributed across nodes of the Kubernetes system and an image cache is provided on each node to speed up pod deployment. Each node includes a host operating system (OS), such as Linux®, and a container engine executing on top of the host OS that supports the containers of the pod. Kubernetes control plane components (e.g., a kubelet) execute on the host OS alongside the containers. Thus, a node includes multiple containers and control plane components executing on a shared OS. Such a configuration results in several security and isolation risks. A single container can consume all the resources of the node thereby starving other containers for resources. A vulnerability in one container can "escape" the container and infect other containers or control plane components running on the shared OS. Thus, it is desirable to provide a system for container orchestration that eliminates or mitigates security and isolation risks.

SUMMARY

In an embodiment, a virtualized computing system includes: a host cluster having a virtualization layer directly executing on hardware platforms of hosts, the virtualization layer supporting execution of virtual machines (VMs), the VMs including pod VMs, the pod VMs including container engines supporting execution of containers in the pod VMs; an orchestration control plane integrated with the virtualization layer, the orchestration control plane including a master server and pod VM controllers, the pod VM controllers executing in the virtualization layer external to the VMs, the pod VM controllers configured as agents of the master server to manage the pod VMs; and pod VM agents, executing in the pod VMs, configured as agents of the pod VM controllers to manage the containers executing in the pod VMs.

In an embodiment, a host computer in a host cluster of a virtualized computing system includes: a hardware platform; a virtualization layer, directly executing on the hardware platform, supporting execution of virtual machines (VMs), the VMs including pod VMs, the pod VMs including container engines supporting execution of containers in the pod VMs; a pod VM controller, executing in the virtualization layer external to the VMs, configured as an agent of an orchestration control plane of the virtualized computing system, the pod VM controller configured to manage the pod VMs; and pod VM agents, executing in the pod VMs, configured as agents of the pod VM controller to manage the containers executing in the pod VMs.

In an embodiment, a method of container orchestration in a virtualized computing system is described. The virtualized computing system includes a host cluster having a virtualization layer directly executing on hardware platforms of hosts, the virtualization layer supporting execution of virtual machines (VMs), the virtualization layer including pod VM controllers of an orchestration control plane executing therein external to the VMs. The method includes: receiving, at a master server of the orchestration control plane, specification data for an application, the master server in communication with the pod VM controllers; and deploying, based on the specification data, pod VMs the VMs, the pod VMs executing on the virtualization layer and within one or more of the hosts, the pod VMs including container engines supporting execution of containers in the pod VMs, the pod VMs executing pod VM agents configured as agents of the pod VM controllers to manage the containers executing in the pod VMs.

DETAILED DESCRIPTION

Figure 1:
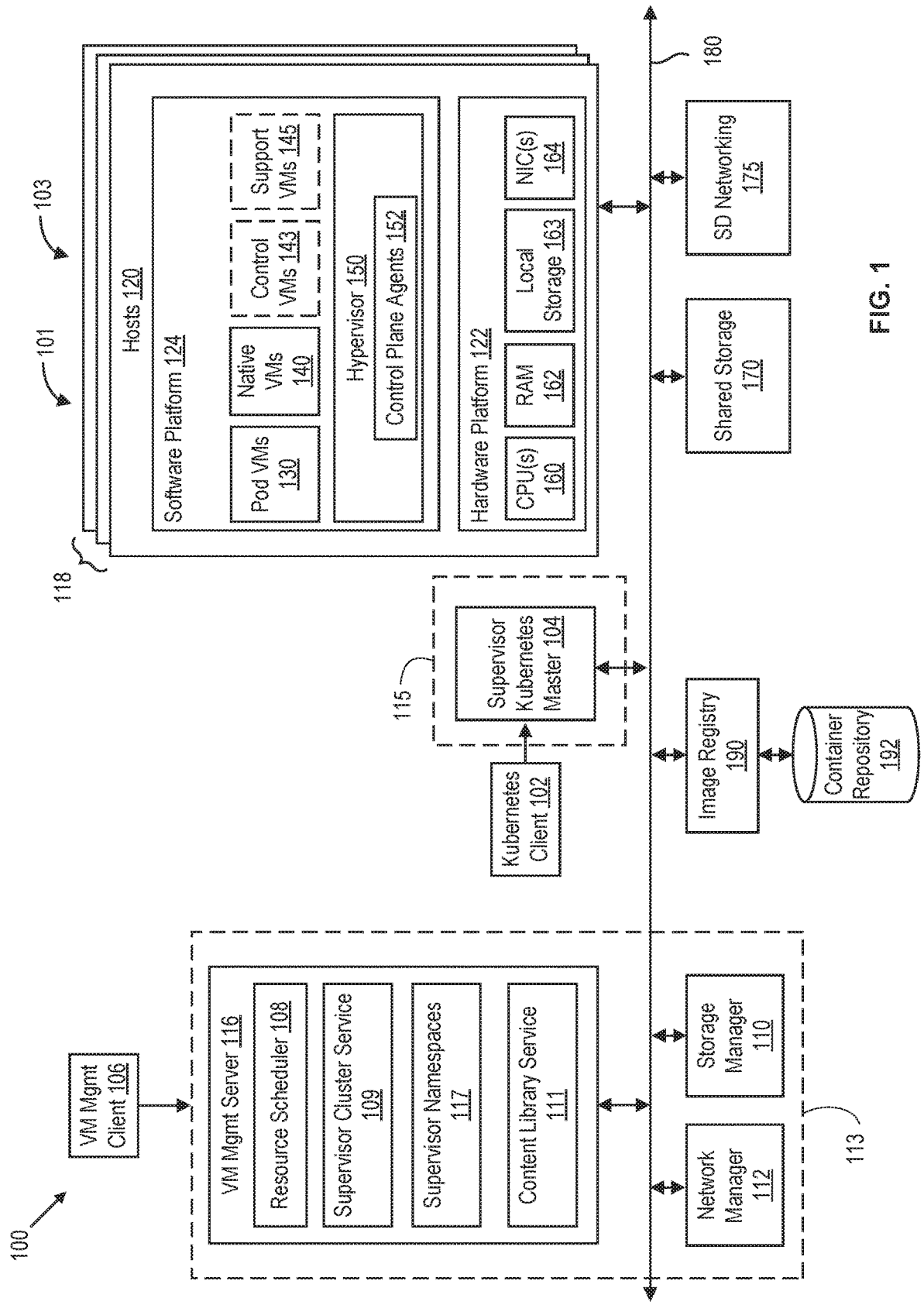
FIG. 1 is a block diagram of a clustered computer system in which embodiments may be implemented.

Container orchestration in a clustered and virtualized computer system is described. Techniques described herein include integrating an orchestration control plane with a host cluster having a virtualization layer directly executing on host hardware platforms (referred to herein as a "Type 1" virtualization layer or "Type 1" virtualization). Type 1 virtualization is also known as "bare-metal virtualization." In embodiment, the orchestration control plane is derived from the Kubernetes control plane. While Kubernetes is described by way of example, those skilled in the art will appreciate that the disclosed techniques can derive from any other container orchestrator that functions the same as or similar to Kubernetes may be employed in place of Kubernetes.

As described above, a conventional Kubernetes implementation includes hosts having a host operating system (OS), such as Linux, executing on the host hardware platforms. Kubernetes control plane components (e.g., kubelets) execute on the host OS alongside containers supported by a container engine. The containers and control plane components share the host OS. This configuration exhibits isolation and security risks as set forth above.

One technique to improve upon the conventional Kubernetes implementation is to provide hosts having a host operating system, such as Linux, executing on the host hardware platforms Kubernetes control plane components (e.g., kubelets) execute on the host OS. A virtualization layer executes on the host OS (e.g., Kernel-based Virtual Machine (KVM)). Such a virtualization layer is known as a "Type 2" virtualization layer, since it executes on a host OS, rather than directly on the host hardware platform. The containers execute in VMs of the Type-2 virtualization layer. Kata Containers® is one system that functions using Type-2 virtualization as described above and is hereinafter referred to by way of example. Kata Containers still exhibit some isolation and security risks. For example, a directory in a VM is mapped to the underlying file system of the host OS, which exposes the host OS filesystem to the containers. In another example, a virtual network adapter of a VM shares the transmission control protocol/internet protocol (TCP/IP) stack of the host OS, again exposing the host OS to the containers.

In embodiments described herein, a virtualized computing system includes a cluster of hosts having a virtualization layer executing on host hardware platforms. The virtualization layer supports execution of virtual machines (VMs). A virtualization management server manages host clusters, the virtualization layers, and the VMs executing thereon. In embodiments, the virtualization layer of a host cluster is integrated with an orchestration control plane, such as a Kubernetes control plane. This integration provides a "supervisor cluster" that uses VMs to implement both control plane nodes and compute objects managed by the Kubernetes control plane. For example, Kubernetes pods are implemented as "pod VMs," each of which includes a kernel and container engine that supports execution of containers. In embodiments, the Kubernetes control plane of the supervisor cluster is extended to support VM objects in addition to pods, where the VM objects are implemented using native VMs (as opposed to pod VMs). A virtualization infrastructure administrator (VI admin) can enable a host cluster as a supervisor cluster and provide its functionality to development teams. In embodiments, the VI admin creates "supervisor namespaces" within the supervisor cluster control plane, which provide resource-constrained and authorization-constrained units of multi-tenancy. Development teams deploy their applications within the scope of the supervisor namespaces and subject to their constraints.

The techniques described herein provide an orchestration system that uses Type-1 virtualization layers. The Type-1 virtualization layer executes directly on the host hardware platform, in contrast to the techniques above where a host OS executes on the host hardware platform. In this architecture, the containers execute in VMs managed by the Type-1 virtualization layer, rather than as isolated OS processes or within VMs managed by a Type-2 virtualization layer. The same interface and control plane are used to control the workloads on the cluster (e.g., Kubernetes). The disclosed architecture addresses the above-described security and isolation problems. It is much more difficult for a vulnerability in a container to escape from a VM to the Type-1 virtualization layer than from an operating system process. The Type-1 hypervisor prevents the vulnerability from impacting other workloads on the same host. Similarly, if a container consumes all available central processing unit (CPU) or memory resources, the container only saturates the virtual resources allocated to the VM, rather than the physical resources shared with all other containers. These and further advantages and aspects of the disclosed architecture are described below with respect to the drawings.

FIG. 1 is a block diagram of a virtualized computing system 100 in which embodiments may be implemented. System 100 includes a cluster 118 of hosts 120 that may be constructed on server-grade hardware platforms such as an x86 architecture platforms (also referred to as "host cluster 118"). As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host OS, between hypervisor 150 and hardware platform 122. Thus, hypervisor 150 is a Type-1 hypervisor (also known as a "bare-metal" hypervisor). Hypervisor 150 abstracts processor, memory, storage, and network resources of hardware platform 122 to provide a virtual machine execution space within which multiple virtual machines (VM) may be concurrently instantiated and executed One example of hypervisor 150 that may be configured and used in embodiments described herein is a VMware ESXi™ hypervisor provided as part of the VMware vSphere® solution made commercially available by VMware, Inc. of Palo Alto, Calif. As shown in FIG. 1, VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of orchestration control plane 115 executing in hypervisor 150 (referred to as a pod VM controller). An example of pod VM 130 is described further below with respect to FIG. 2. Some native VMs 140 have specific functions within host cluster 118, such as control VMs 143 and support VMs 145. Control VMs 143 are VMs that implement control planes as described further herein. Support VMs 145 are VMs that are created by a control plane to support applications implemented using pod VMs 130 and/or native VMs 140. An embodiment of software platform 124 is discussed further below with respect to FIG. 2.

Software platform 124 is configured with software-defined (SD) networking 175. SD networking 175 includes a data plane having various logical components, such as routers, switches, gateways, firewalls, load balancers, and the like, coupled to form logical networks that overlay network 180. The terms "logical" and "virtual" are used interchangeably herein with respect to SD networking 175. SD networking 175 includes a control plane configured to manage the data plane. Some components of the control and data planes are implemented as support VMs 145 (e.g., logical router control VMs, load balancers, edge gateways, etc.). Other components are implemented as part of hypervisor 150 (e.g., logical switches, logical routers, distributed firewalls, etc.).

VM management server 116 is a physical or virtual server that provisions pod VMs 130 and VMs 140 from the hardware resources of hosts 120. VM management server 116 installs a control plane agent 152 in hypervisor 150 to add a host 120 as a management entity. VM management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in the cluster may be one or many. Each host 120 in cluster 118 has access to shared storage 170 via network 180. VM management server 116 can also communicate with shared storage 170 via network 180 to perform control operations thereon.

In an embodiment, VM management server 116 includes a resource scheduler 108. Resource scheduler 108 is configured to aggregate the resources of host cluster 118 to provide resource pools and enforce resource allocation policies. Resource scheduler 108 also provides resource management in the form of load balancing, power management, VM placement, and the like.

In an embodiment, VM management server 116 further includes a supervisor cluster service 109. Supervisor cluster service 109 configures host cluster 118 to be part of a supervisor cluster 101. Supervisor cluster service 109 installs a control plane agent 152 in hypervisor 150 to add a host 120 to supervisor cluster 101. Supervisor cluster 101 integrates an orchestration control plane, such as Kubernetes, with host cluster 118. In embodiments, Kubernetes is described as the orchestration control plane for supervisor cluster 101 in supervisor cluster 101, hosts 120 become nodes for use by the orchestration control plane. Supervisor cluster service 109 provisions one or more virtual servers as "master servers" to manage the orchestration control plane. In the embodiment of FIG. 1, supervisor cluster 101 includes a supervisor Kubernetes master 104 that functions as a master server for an orchestration control plane 115 of supervisor cluster 101. For purposes of clarity, supervisor Kubernetes master 104 is shown as a separate logical entity. For implementations, supervisor Kubernetes master 104 can be implemented as a control VM 143 (an optionally pod VMs 130) in host cluster 118. Further, although only one supervisor Kubernetes master 104 is shown, supervisor cluster 101 can include more than one supervisor Kubernetes master 104. An embodiment of supervisor Kubernetes master 104 is described below with respect to FIG. 3.

In an embodiment, system 100 further includes storage manager 110. Storage manager 110 is a physical or virtual server that provisions virtual disks in shared storage 170 (or a vSAN formed from local storage 163) as independent objects. That is, virtual disks that persist apart from the lifecycle of any VM or container. Various components can interact with storage manager 110 to provision persistent storage, such as VM management server 116 and supervisor Kubernetes master 104. Storage manager 110 can operate independently from VM management server 116 (e.g., as an independent physical or virtual server). Alternatively, storage manager 110 can be a service in VM management server 116 (e.g., alongside components such as resource scheduler 108 and supervisor cluster service 109).

In an embodiment, system 100 further includes a network manager 112. Network manager 112 is a physical or virtual server that manages SD networking 175 for hosts 120. Network manager 112 can install a control plane agent 152 in hypervisor 150 to add a host 120 as a management entity. Network manager 112 configures host cluster 118 to be part of a transport zone 103. Transport zone 103 integrates logical networking control and data planes with host cluster 118. In transport zone 103, hosts 120 become transport nodes having shared logical networking resources. Network manager 112 can operate independently from VM management server 116 (e.g., as an independent physical or virtual server). Alternatively, network manager 112 can be a service of VM management server 116 (e.g., alongside components such as resource scheduler 108 and supervisor cluster service 109).

VM management server 116, network manager 112, and storage manager 110 comprise a virtual infrastructure (VI) control plane 113 for host cluster 118. In embodiments, one or more of VM management server 116, network manager 112, and storage manager 110 are implemented using control VM(s) 143. Alternatively, one or more of VM management server 116, network manager 112, and storage manager 110 can be external to host cluster 118.

In an embodiment, system 100 further includes an image registry 190 and a container repository 192. As described further herein, containers of supervisor cluster 101 execute in pod VMs 130. Containers are spun up from container images. Container images are registered with image registry 190, which manages a plurality of container repositories (one of which is shown in FIG. 1 as container repository 192) in which images of all containers registered with image registry 190 are stored. During registration of a container image, image registry 190 collects authentication information and during subsequent requests to access the registered container images, authenticates the requester using the collected authentication information. Once the requester is authenticated, image registry 190 permits the requester to fetch the container images registered to the requester.

A VI administrator (VI admin) can interact with VM management server 116 through a VM management client 106. Through VM management client 106, a VI admin commands VM management server 116 to form host cluster 118, configure resource pools, resource allocation policies, and other cluster-level functions, configure storage and networking, and create supervisor cluster 101. VM admin can also interact with VM management server 116 to define supervisor namespaces 117. A supervisor namespace 117 provides resource constraints, authorization constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD networking 175). Authorization constraints include definitions of users, roles, privileges, bindings of roles to privileges, and the like. Each supervisor namespace 117 includes a portion within orchestration control plane 115, which allows users to provision applications in supervisor cluster 101 within the scope of supervisor namespaces 117.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace 117. In response, supervisor Kubernetes master 104 configures supervisor cluster 101 to match the desired state by creating pod VMs 130, creating native VMs 140, connecting VMs to storage and logical networks, destroying pod VMs 130 and native VMs 140, and the like. The resources are deployed within the confines of the supervisor namespace. In this manner, the user interacts with supervisor Kubernetes master 104 to deploy applications in supervisor cluster 101 within defined supervisor namespaces 117.

Figure 2:
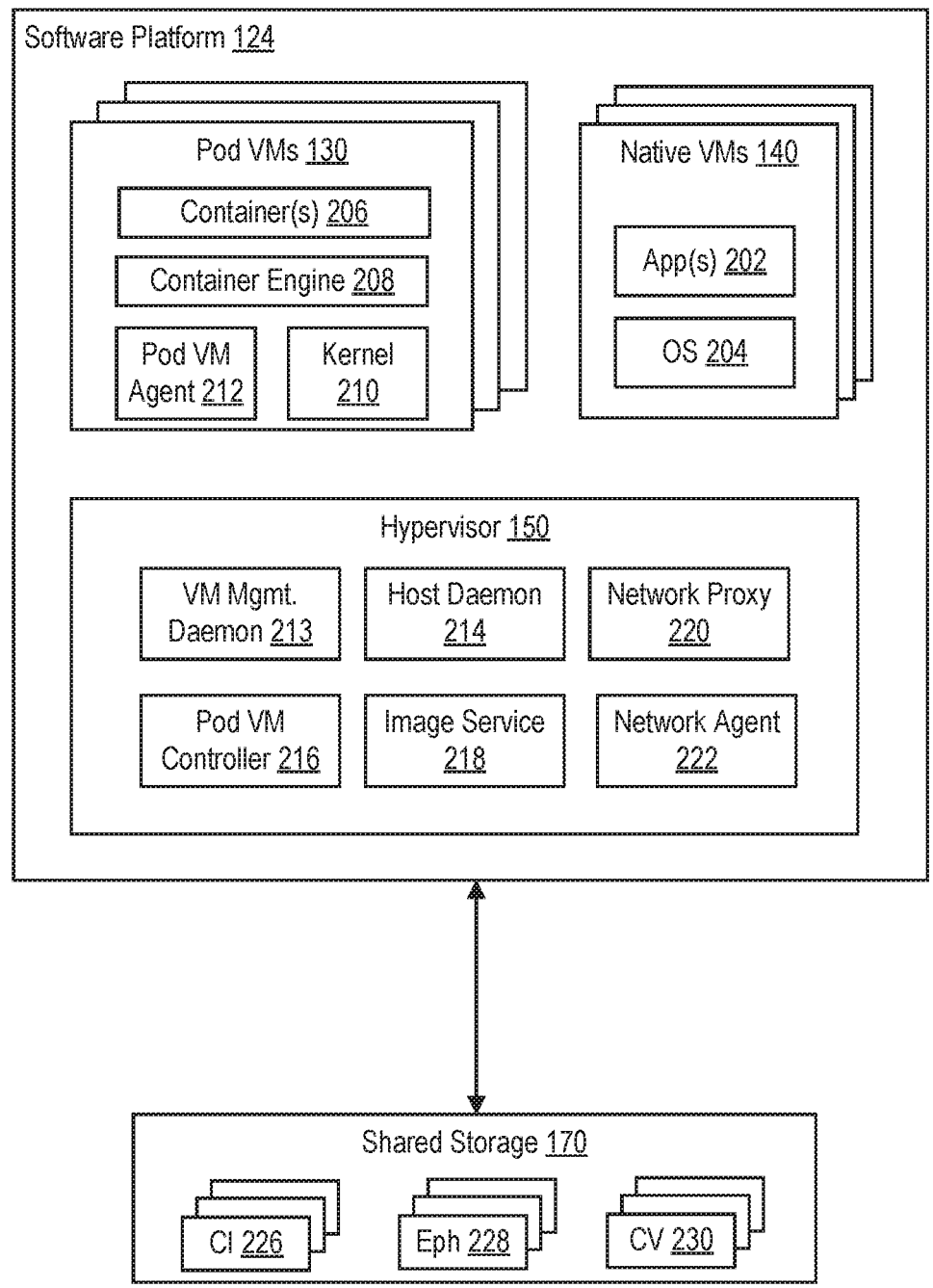
FIG. 2 is a block diagram depicting a software platform and shared storage according an embodiment.

FIG. 2 is a block diagram depicting software platform 124 and shared storage 170 according an embodiment. As described above, software platform 124 of host 120 includes hypervisor 150 that supports execution of pod VMs 130 and native VMs 140. In an embodiment, hypervisor 150 includes a VM management daemon 213, a host daemon 214, a pod VM controller 216, an image service 218, and a network agent 222. VM management daemon 213 is a control plane agent 152 of VI control plane 113. VM management daemon 213 provides an interface to host daemon 214 for VM management server 116. Host daemon 214 is configured to create and destroy VMs (e.g., pod VMs 130 and native VMs 140).

Pod VM controller 216 is a control plane agent 152 of orchestration control plane 115 for supervisor cluster 101 and allows Kubernetes master 104 to interact with hypervisor 150. Pod VM controller 216 configures the respective host as a node in orchestration control plane 115. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images.

Network agent 222 comprises a control plane agent 152 of SD networking 175. Network agent 222 is configured to cooperate with network management and control planes (e.g., network manager 112) to implement logical network resources. Network agent 222 configures the respective host as a transport node in a transport zone managed by network manager 112. Network proxy 220 functions as described below.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd.

Each of containers 206 has a corresponding container image (CI) 226 stored as a read-only virtual disk in shared storage 170. These read-only virtual disks are referred to herein as CI disks. Additionally, each pod VM 130 has a virtual disk provisioned in shared storage 170 for reads and writes. These read-write virtual disks are referred to herein as ephemeral disks and are depicted in FIG. 2 as Eph 228. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks depicted in FIG. 2 as CV 230.

As described in embodiments above, each host 120 in host cluster 118 includes a pod VM controller 216 executing in hypervisor 150. Pod VM controller 216 is functionally similar to a kubelet as provided in the control plane of native Kubernetes. In terms of resource management, a kubelet is designed to manage a node which has static boundaries and finite resources. The main concepts kubelet uses to manage resources are file system space, CPU, memory, the concept of node allocatable, quality of service (QoS) categories, eviction threshold, out of memory (OOM) handling, and garbage collection. Kubelet both measures file system space in bytes inodes. There are many different types of state that can be stored by different pods and containers, this is almost impossible to account for predictively. Ephemeral storage is the only configuration setting that's possible to reserve for pods and containers. Kubernetes allows for reservations and limits on CPU and this is accounted for by kubelet (see QoS below). Kubernetes allows for reservations and limits on memory and this is accounted for by kubelet (see QoS below). Given that there is a lot going on within a single node that has to be managed, kubelet has a series of strategies for trying to ensure that resources are allocated fairly. Kubelet allows the sysadmin to configure a subset of the node's capacity as allocatable for pods (node allocatable). Kubelet has other parameters such as kube-reserved and system-reserved to try to ensure adequate resources are available for the underlying services needed to run the node. Kubelet manages separate cgroups to ensure that resource contention in application pods cannot bring down the control plane. Kubelet infers a Quality of Service metric based on whether reservations or limits are set on a pod. This is important because it's possible for a node to schedule pods that have no resource limits alongside pods that have resource reservations. As such, kubelet cannot account for the needs of all pods by just dividing the node up into buckets. In the case where resource becomes tight, pods with no limits or reservations will be the first to be evicted from the node. Eviction thresholds can be set on the node, so that if pods are using a certain percentage of a resource, the eviction algorithm will start to kill pods. Kubelet has an OOM handler that will kill pods using an algorithm that favors pods with a lower QoS. Kubelet will attempt to garbage collect container images and other cached or ephemeral state if it starts to hit storage thresholds.

Pod VM controller 216 functions similarly to Kubelet with the following exceptions. There is no notion of "node allocatable" or reservations for system pods or services. Resource scheduler 108 determines how much resource is available to pod VMs and will place and allocate accordingly. Any memory or CPU reservation settings on the containers is rolled up into a compound resource scheduler memory or CPU reservations for the pod VM. Since the values for a pod are inferred, there's no reason pod VM should not use the same categories as native Kubernetes. One trigger for pod eviction is memory or CPU pressure on any given pod VM. Resource scheduler 108 identifies suitable candidates for reclamation. The eviction threshold on memory/CPU contention is not configurable in the same way as it is in kubelet. The pod VM agent 212 or pod VM controller 216 do not attempt to clean up ephemeral storage in a pod VM 130. Persistent volumes are not garbage collected. Instead, persistent volumes are explicitly created and deleted.

Figure 3:
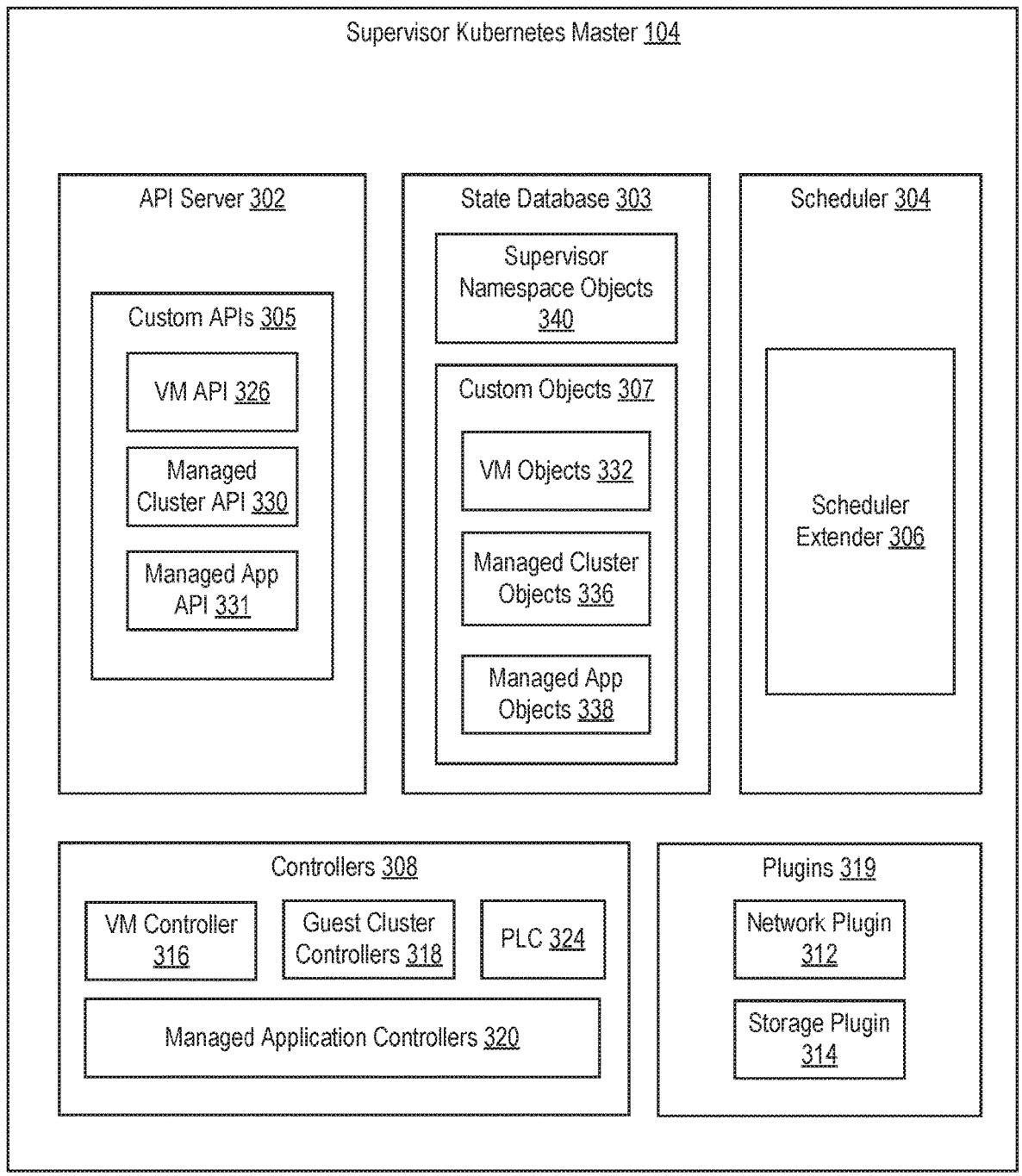
FIG. 3 is a block diagram of supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319. Controllers 308 can include, for example, VM controller 316, guest cluster controllers 318, platform lifecycle controller (PLC) 324, and managed application controller(s) 320. Plugins 319 can include, for example, network plugin 312 and storage plugin 314.

API server 302 provides an API for use by Kubernetes client 102 (e.g., kube-apiserver) API server 302 is the front end of orchestration control plane 115. The Kubernetes API provides a declarative schema for creating, updating, deleting, and viewing objects. State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state.

Namespaces provide scope for Kubernetes objects. Namespaces are objects themselves maintained in state database 303. A namespace can include resource quotas, limit ranges, role bindings, and the like that are applied to objects declared within its scope. As described above, a VI admin cooperates with VM management server 116 to define supervisor namespaces 117 for supervisor cluster 101. A supervisor namespace 117 is a resource-constrained and authorization-constrained unit of multi-tenancy managed by VM management server 116. State database 303 stores supervisor namespace objects 340. VM management server 116 creates a supervisor namespace object 340 for each supervisor namespace 117, pushing down resource constraints and authorization constraints into orchestration control plane 115.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with VM management server 116. Scheduler extender 306 cooperates with VM management server 116 (e.g., such as with resource scheduler 108) to select nodes from candidate sets of nodes and provide identities of hosts 120 corresponding to the selected nodes. For each pod, scheduler 304 also converts the pod specification to a pod VM specification, and scheduler extender 306 asks VM management server 116 to reserve a pod VM on the selected host 120. Scheduler 304 updates pods in state database 303 with host identifiers.

A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems. PLC 324 is responsible for tracking pods that have assigned nodes without pod VM identifiers. PLC 324 cooperates with VM management server 116 to commit reserved pod VMs for pods. VM management server 116 returns a pod VM identifier to PLC 324, which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 302. Alternatively, an extension API server can be used to introduce a custom object 307 by API server aggregation, where the extension API server is fully responsible for the custom resource. A user interacts with custom APIs 305 of API server 302 to create custom objects 307 tracked in state database 303. A controller 308 is used to watch for and actuate on custom objects 307 declared in state database 303. In Kubernetes, a controller responsible for the lifecycle of custom resources is referred to as an "operator." However, the term controller will be used throughout this specification for consistency.

In an embodiment, orchestration control plane 115 is extended to support orchestration of native VMs, guest clusters, and other managed application(s). This extensibility can be implemented using either CRDs or an extension API server in supervisor Kubernetes master 104. Custom APIs 305 include VM API 326, managed application API 331, and managed cluster API 330. A user or a controller 308 can invoke VNM API 326 to create VNM objects 332, which represent native VMs.

In embodiments, the controlled extensibility of the supervisor cluster is leveraged to deliver a "guest cluster" as a custom object ("managed cluster objects 336"). The guest cluster comprises a standard Kubernetes control plane and associated nodes, as well as components for interfacing the underlying supervisor cluster. The guest cluster executes within compute objects of managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster). Guest clusters build on the workload management functionality provided by the supervisor cluster, which provides development teams with familiar control over cluster configuration and cluster lifecycle.

A user can invoke managed cluster API 330 to create managed cluster objects 336. A managed cluster object 336 defines a Kubernetes cluster at a high level to be implemented as a guest cluster. For example, a managed cluster object 336 can be specified by a cluster name, version of Kubernetes to use, a storage class to apply to the control plane nodes, a number of worker nodes, and a storage class to apply to the worker nodes. Other specifications for a managed cluster object 336 can be computed, inherited, or have default values. Similar to managed clusters, a user can invoke managed application API 331 to create managed application objects 338. A managed application object 338 defines an application, which can include various components, such as a Kubernetes cluster, a legacy application, microservices, and a database application.

Each of the custom objects 307 has a corresponding controller 308. VM controller 316 is configured to monitor state database 303 for creation of VM objects 332. VM controller 316 cooperates with VM management server 116, network manager 112, and/or storage manager 110 to deploy native VMs 140 to implement VM objects 332. VM controller 316 manages the lifecycle of native VMs 140 implementing VM objects 332. Guest cluster controllers 318 are configured to monitor state database 303 for creation of managed cluster objects 336. Guest cluster controllers 318 consume the specification of a managed cluster object 336 and define various objects that represent an abstract implementation and a physical implementation of a Kubernetes cluster per the specification. Managed application controllers 320 are configured to monitor state database 303 for creation of managed application objects 338. Managed application controllers 320 consume the specification of a managed application object 338 and define various objects that represent abstract and physical implementations of a compound application per the specification. VM controller 316, managed application controllers 320, and guest cluster controllers 318 also manage lifecycles of their respective objects.

Plugins 319 provide a well-defined interface to replace a set of functionality of the Kubernetes control plane. Network plugin 312 is responsible for configuration of logical networking of SD networking 175 to satisfy the needs of network-related resources. Network plugin 312 cooperates with VM management server 116 and/or network manager 112 to implement the appropriate logical network resources. Storage plugin 314 is responsible for providing a standardized interface for persistent storage lifecycle and management to satisfy the needs of resources requiring persistent storage. Storage plugin 314 cooperates with VM management server 116 and/or storage manager 110 to implement the appropriate persistent storage volumes in shared storage 170.

Figure 4:
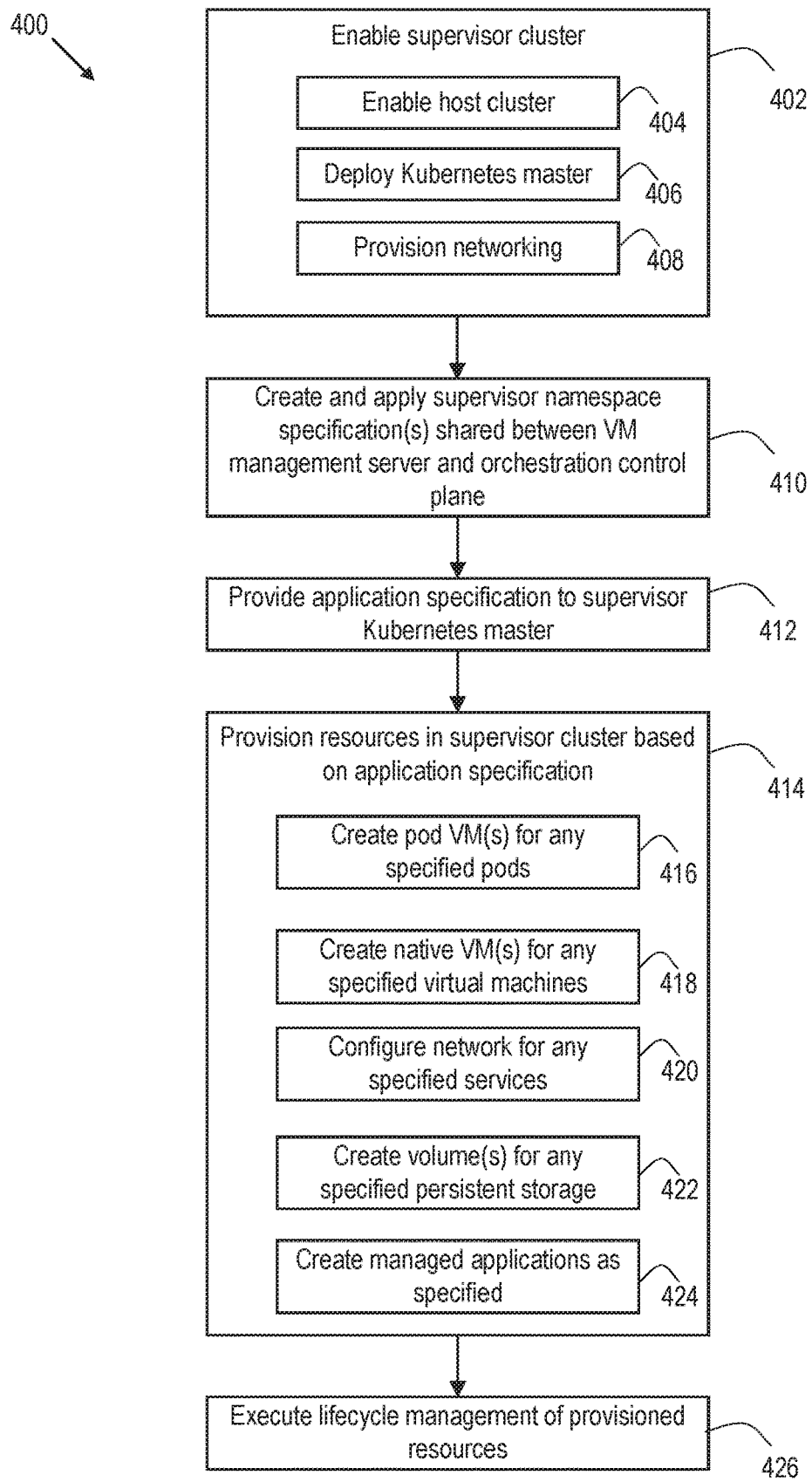
FIG. 4 is a flow diagram depicting a method of creating a supervisor cluster and managing container orchestration therein according to an embodiment.

FIG. 4 is a flow diagram depicting a method 400 of creating a supervisor cluster and managing container orchestration therein according to an embodiment. Method 400 can be performed by VI control plane 113 and orchestration control plane 115, which comprise software executing on CPU, memory, storage, and network resources managed by a virtualization layer (e.g., a hypervisor) and/or host operating system. Method 400 begins at step 402, where a VI admin interacts with VM management server 116 through VM management client 106 to enable supervisor cluster 101 on host cluster 118. In an embodiment, the VI admin provides a declarative specification to VM management server 116 that results in enabling host cluster 118 (404), deploying supervisor Kubernetes master 104 (406), and provisioning networking within SD networking 175 (408). VM management server 116 then takes the necessary action to configure supervisor cluster 101.

At step 410, VM management server 116 creates and applies supervisor namespace specification(s) to orchestration control plane 115 (e.g., Kubernetes® master 104). A VI admin interacts with VM management server 116 to define one or more supervisor namespaces. A VI admin creates "supervisor namespaces" that provide resource-constrained and authorization-constrained units of multi-tenancy in VI control plane 113 (e.g., on VM management server 116). For example, each supervisor cluster can be backed by a resource pool of CPU and memory resources, as well as a user access policy Users deploy their applications within the scope of the supervisor namespaces and subject to their constraints VM management server 116 creates the corresponding objects for supervisor clusters in VI control plane 113 (e.g., resource pools, user access policy, etc.) VM management server 116 then applies the specification(s) of supervisor namespace(s) to orchestration control plane 115, for example, by cooperating with Kubernetes® master 104 to create native Kubernetes namespaces for each supervisor namespace. Each Kubernetes native namespace includes resource constraints, authorization constraints, and the like derived from a respective supervisor namespace.

At step 412, a user having access to supervisor cluster 101 provides an application specification to supervisor Kubernetes master 104. The application specification can include the various objects discussed above, such as pods, VM objects, storage objects, managed cluster objects, managed application objects, and the like. The application specification can be defined with respect to a supervisor namespace. At step 414, supervisor Kubernetes master 104, in cooperation with VM management server 116 and hypervisor 150 in hosts 120, provisions resources in supervisor cluster 101 based on the application specification. For example, at step 416, supervisor Kubernetes master 104 controls creation of pod VMs 130 for any specified pod objects. At step 418, supervisor Kubernetes master 104 controls creation of native VMs 140 for any specified VM objects. At step 420, supervisor Kubernetes master 104 cooperates with network manager 112 to configure SD networking 175 for any specified service objects. At step 422, supervisor Kubernetes master 104 controls creation of persistent volumes for any specified persistent storage objects. At step 424, supervisor Kubernetes master 104 controls creation of managed applications for any specified manage application objects (e.g., including guest clusters). At step 426, pod VM controller 216, pod VM agent 212, supervisor Kubernetes master 104, and VM management server 116 cooperate to execute lifecycle management of the provisioned resources (e.g., lifecycle management of pod VMs 130, native VMs 140, managed applications, guest clusters, etc.). The provisioned resources in step 414 are within the constraints of any specified supervisor namespace for the application.

Figure 5A:
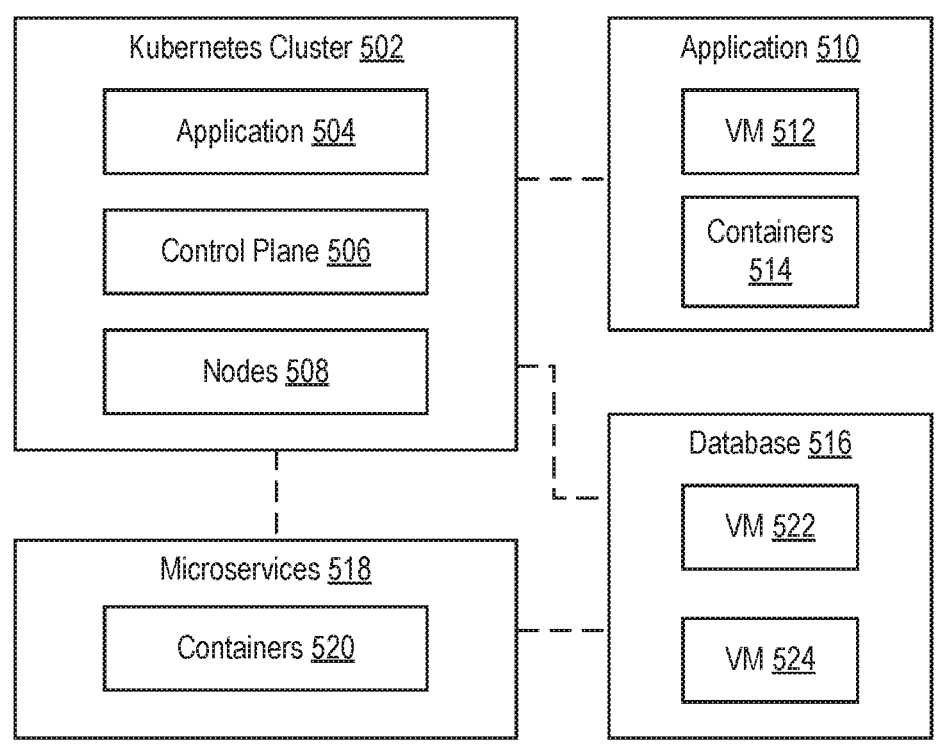
FIG. 5A is a block diagram depicting an application specification according to an embodiment.

FIG. 5A is a block diagram depicting an application specification 500 according to an embodiment. A user can interact with supervisor Kubernetes master 104 through Kubernetes client 102 to provide the application specification 500. In this example, application specification 500 defines an application having Kubernetes cluster 502, an application 510, microservices 518, and a database 516. Kubernetes cluster 502 includes nodes 508 and a control plane 506 that support an application 504. Application 510 is specified by a VM object for a VM 512 and a pod for containers 514. Microservices 518 is specified by pods for containers 520. Database 516 is specified by VM objects for VMs 522 and 524. Application specification provides for network connections among Kubernetes cluster 502, application 510, database 512, and microservices 518.

Figure 5B:
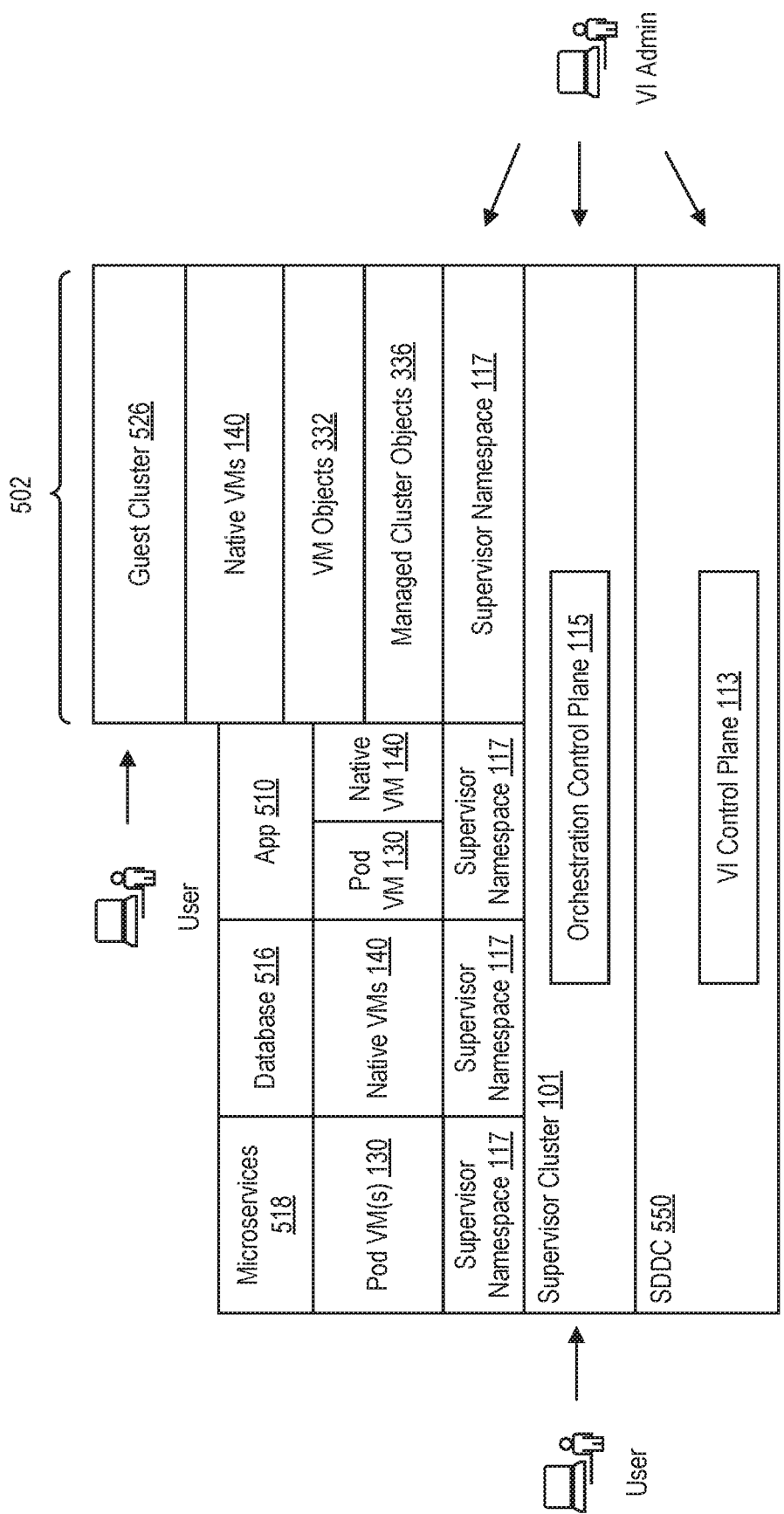
FIG. 5B is a block diagram depicting implementation of application specification on supervisor cluster according to an embodiment.

FIG. 5B is a block diagram depicting implementation of application specification 500 on supervisor cluster 101 according to an embodiment. Supervisor cluster 101 is implemented by a software-defined data center (SDDC) 550. SDDC 550 includes virtualized computing system 100 shown in FIG. 1, including host cluster 118, VM management server 116, network manager 112, storage manager 110, shared storage 170, and SD networking 175. SDDC 550 includes VI control plane 113 for managing a virtualization layer of host cluster 118, along with shared storage 170 and SD networking 175. A VI admin interacts with VM management server 116 (and optionally network manager 112) of VI control plane 113 to configure SDDC 550 to implement supervisor cluster 101.

Supervisor cluster 101 includes orchestration control plane 115, which includes supervisor Kubernetes master(s) 104 and pod VM controllers 216. The VI admin interacts with VM management server 116 to create supervisor namespaces 117. Each supervisor namespace 117 includes a resource pool and authorization constraints. The resource pool includes various resource constraints on supervisor namespace 117 (e.g., reservation, limits, and share (RLS) constraints). Authorization constraints provide for which roles are permitted to perform which operations in supervisor namespace 117 (e.g., allowing VI admin to create, manage access, allocate resources, view, and create objects; allowing DevOps to view and create objects; etc.) A user interacts with supervisor Kubernetes master 104 to deploy applications on supervisor cluster 101 within scopes of supervisor namespaces 117. In the example, the user deploys microservices 518 on pod VM(s) 130, database 516 on native VM 140, and application 510 on both a pod VM 130 and a native VM 140.

The user also deploys guest cluster 526 on supervisor cluster 101 within a supervisor namespace 117 to implement Kubernetes cluster 502. Guest cluster 526 is constrained by the authorization and resource policy applied by the supervisor namespace in which it is deployed. Orchestration control plane 115 includes guest cluster infrastructure software (GCIS) configured to realize guest cluster 526 as a virtual extension of supervisor cluster 101. The GCIS creates and manages managed cluster objects 336 to provide an abstract representation of infrastructure supporting guest cluster 526 (nodes 508) and VM objects 332 to provide a physical representation of the infrastructure (native VMs 140 implementing nodes 508). GCIS comprises guest VM API 326, VM controller 316, managed cluster API 330, and guest cluster controllers 318. A user can interact with the Kubernetes control plane (control plane 506) in guest cluster 526 to deploy various containerized applications (application 504).

Figure 6A:
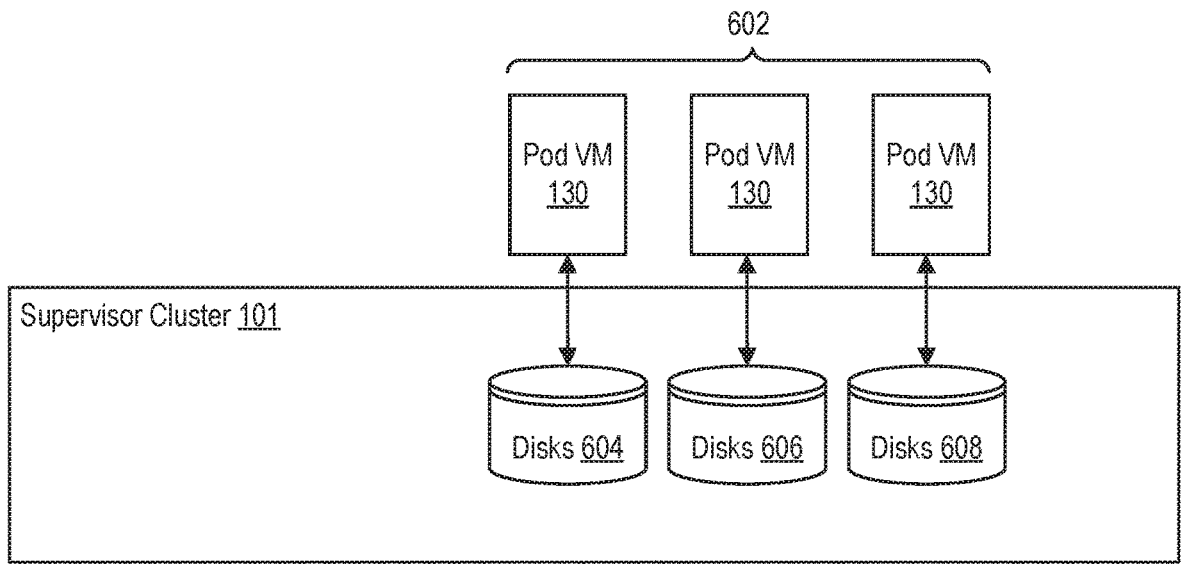
FIG. 6A is a block diagram depicting a storage configuration for pod VMs in supervisor cluster according to an embodiment.
Figure 6B:
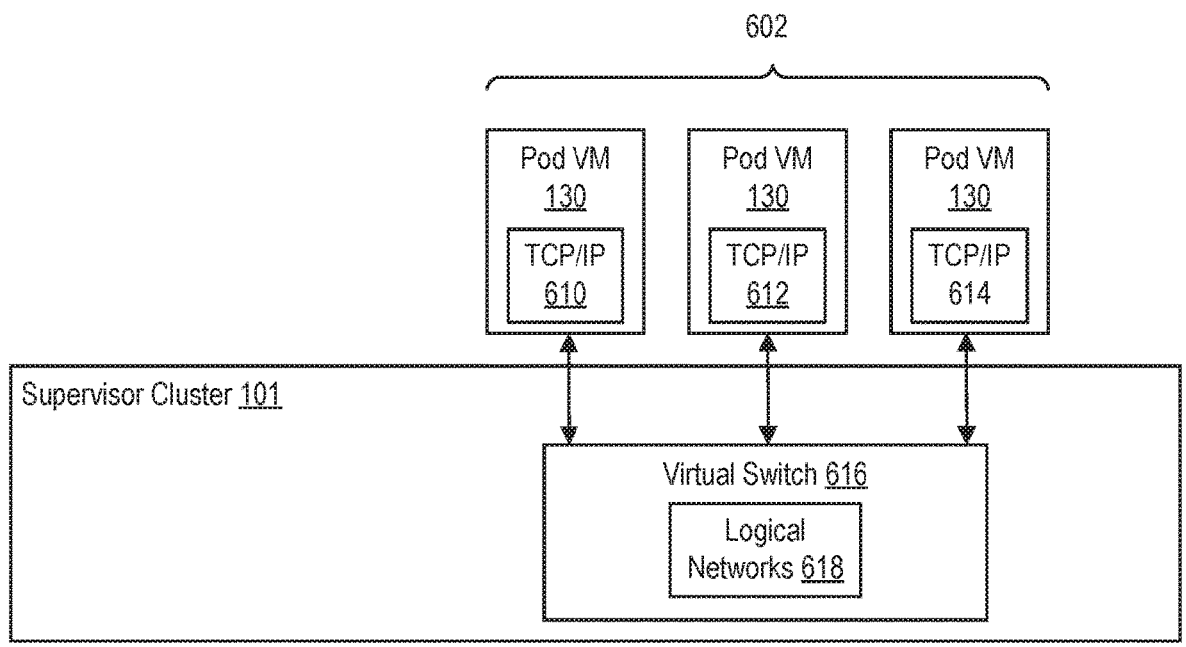
FIG. 6B is a block diagram depicting a network configuration for pod VMs in supervisor cluster according to an embodiment.

FIG. 6A is a block diagram depicting a storage configuration for pod VMs in supervisor cluster 101 according to an embodiment. FIG. 6B is a block diagram depicting a network configuration for pod VMs in supervisor cluster 101 according to an embodiment. As shown in FIG. 6A, an application 602 is implemented using three pod VMs 130. Each pod VM 130 is attached to a plurality of disks 604. Disks 604 are virtual disks that provide for container image storage, ephemeral storage, and optionally persistent storage. In some container orchestration systems, such as Kata Containers, the containers within the VMs are attached to directories in the filesystem of the underlying host OS. This may present some isolation and security risks as the filesystem of the host OS is exposed to the containers. In contrast, as shown in FIG. 6A, the containers within pod VMs 130 are attached to separate virtual disks. The underlying hypervisor 150 is not exposed to the containers in the pod VMs 130.

As shown in FIG. 6B, each pod VM 130 maintains its own transmission control protocol/internet protocol (TCP/IP) stack managed by kernel 210. Each pod VM 130 includes a virtual NIC coupled to a logical port on virtual switch 616 managed by hypervisor 150. Virtual switch 616 can implement a plurality of logical networks 618 (e.g., logical switches, logical routers, load balances, service routers, etc.). In some container orchestration systems, such as Kata Containers, the VMs include virtual network interfaces that share the TCP/IP stack of the underlying host OS. Thus, the containers across all VMs share the TCP/IP stack of the underlying host OS. This may present some isolation and security risks. In contrast, as shown in FIG. 6B, the containers within pod VMs 130 have their own TCP/IP stacks and maintain their isolation from each other and the underlying hypervisor 150.

Figure 7A:
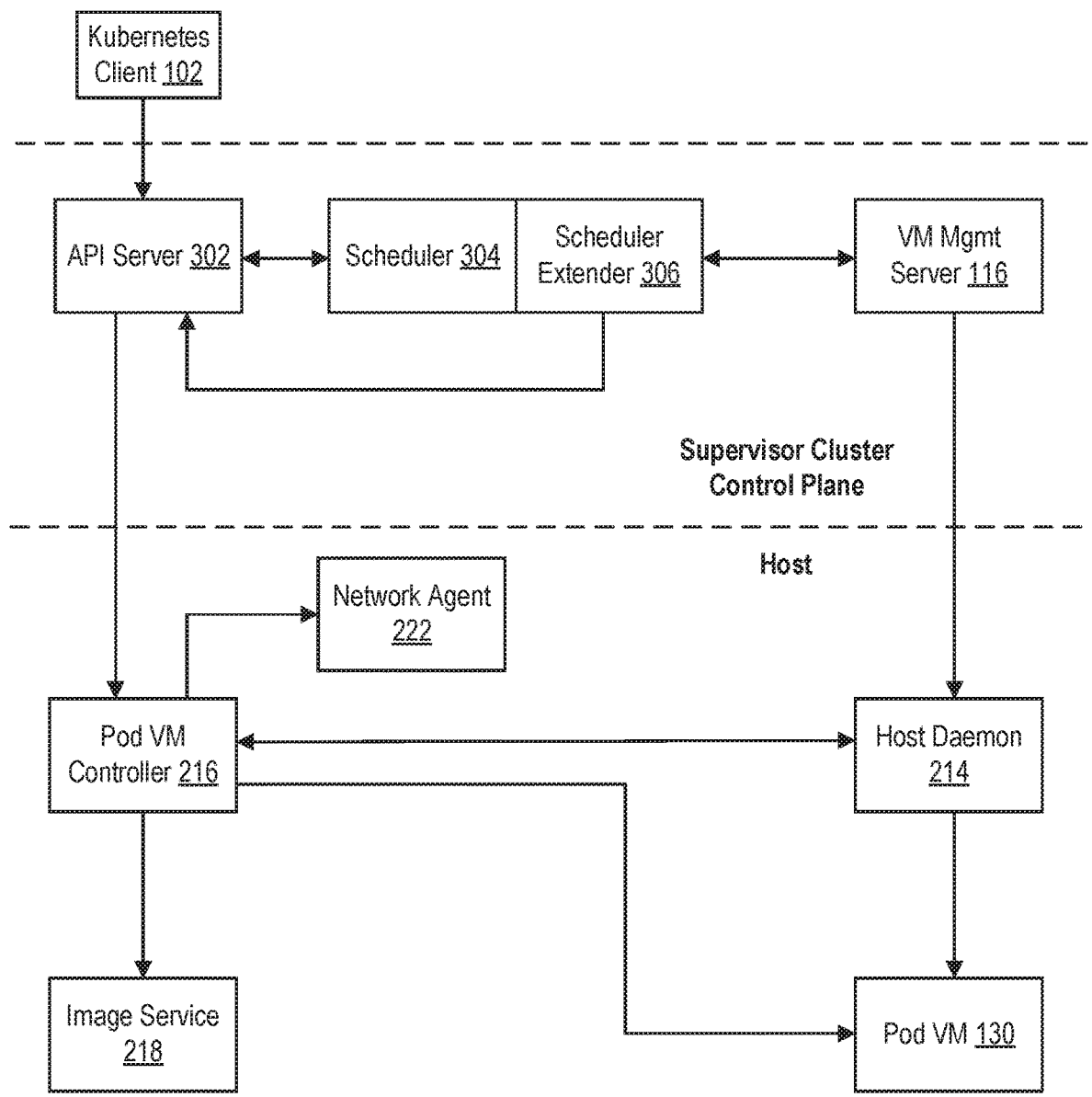
FIGS. 7A-7D illustrate a process of deploying a pod VM in a supervisor cluster in response to specification by a user according to an embodiment.
Figure 7B:
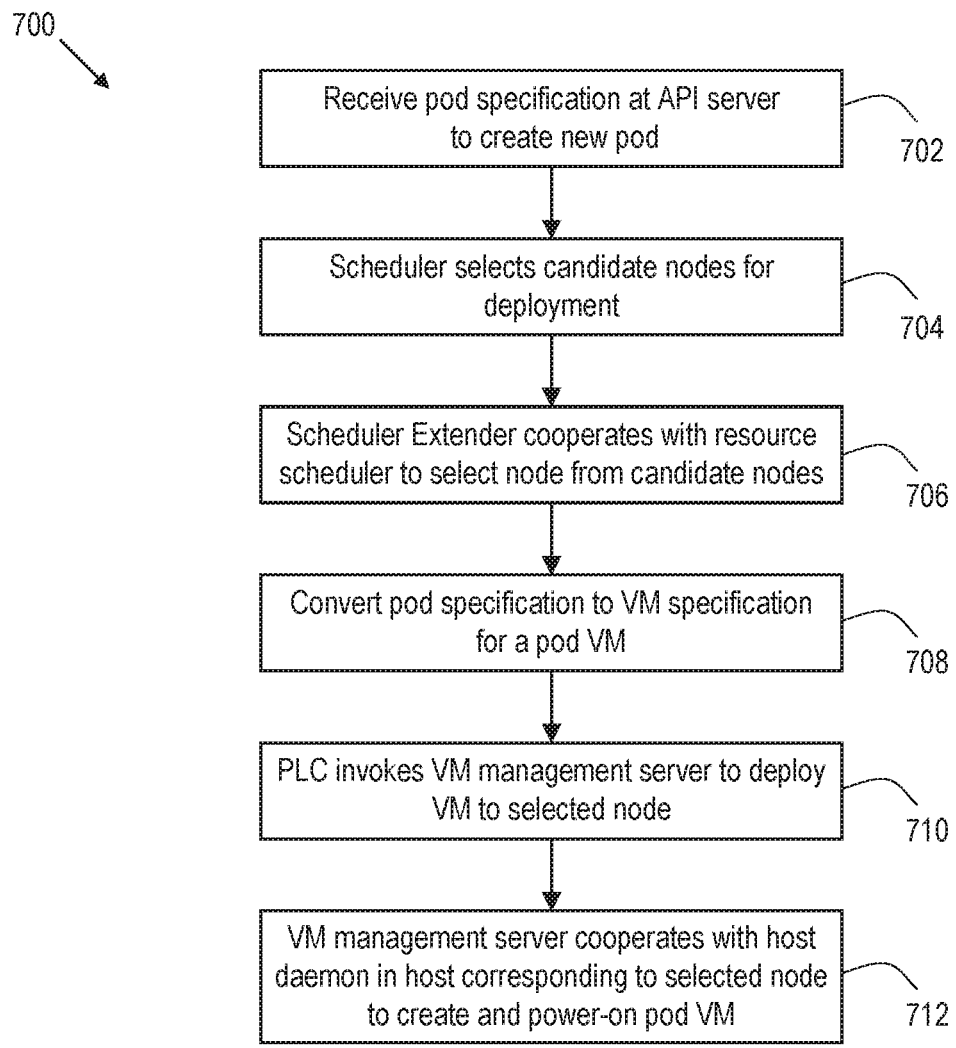
Figure 7C:
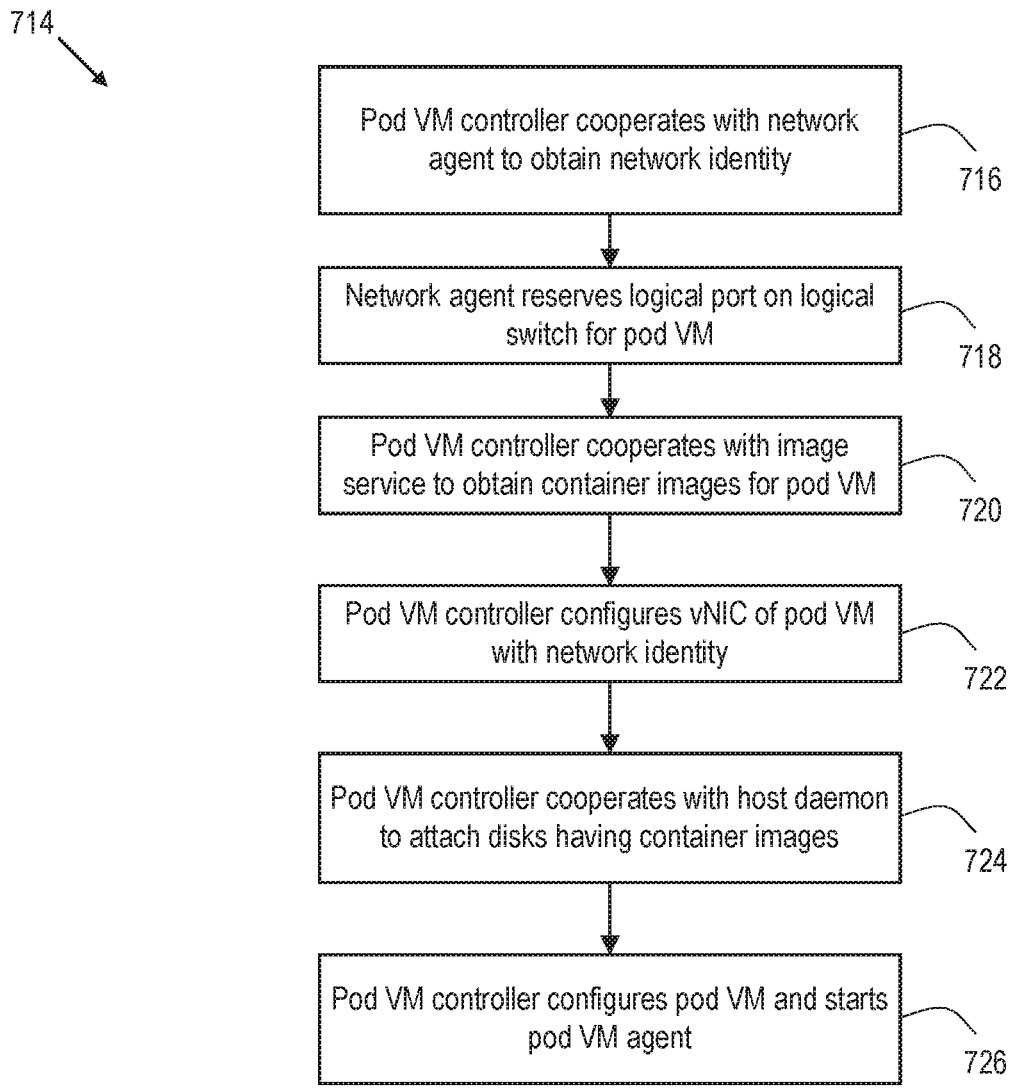
Figure 7D:
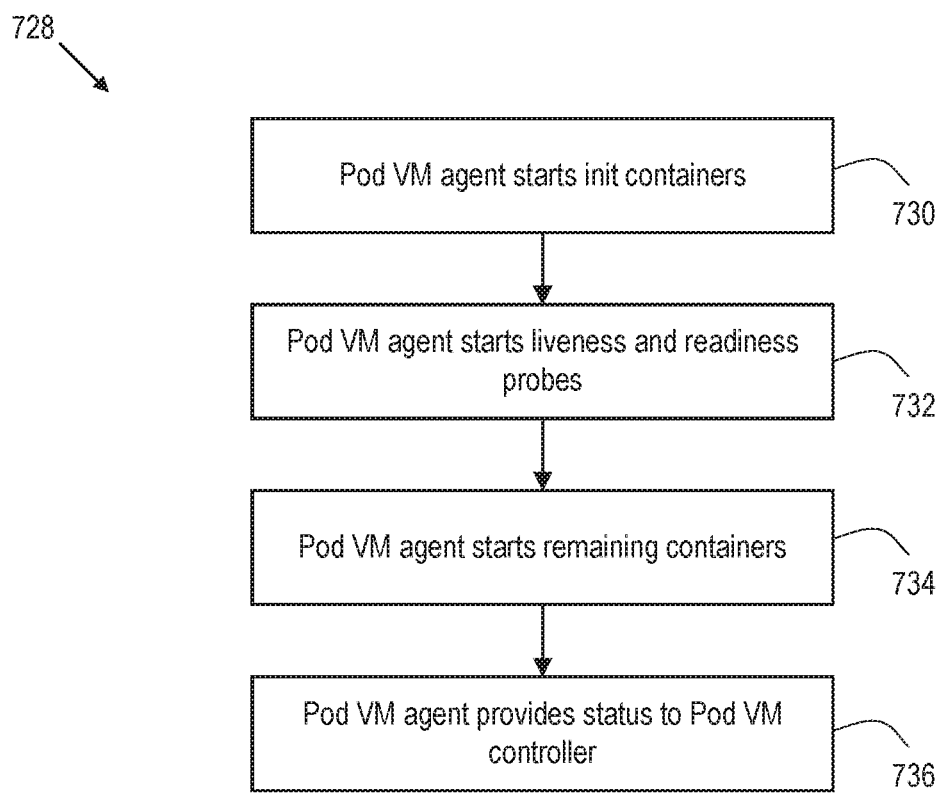

FIGS. 7A-7D illustrate a process of deploying a pod VM in a supervisor cluster in response to specification by a user according to an embodiment. In particular, FIG. 7A is a block diagram showing the logical relationship between supervisor cluster components during pod VM deployment FIG. 7B is a flow diagram depicting operations of supervisor Kubernetes master 104 and VM management server 116 according to an embodiment. FIG. 7C is a flow diagram depicting operations of pod VM controller 216 according to an embodiment. FIG. 7D is a flow diagram depicting operations of pod VM agent 212 according to an embodiment.

As shown in FIG. 7A, API server 302 receives application specification data from Kubernetes client 102. In FIG. 7A, state database 303 is not explicitly shown Scheduler 304 and scheduler extender 306 read and update state for API server 302 based on the scheduling operations Scheduler extender 306 communicates with VM management server 116. VM management server 116 communicates with host daemon 214 in hypervisor 150, which in turn creates pod VM 130. Pod VM controller 216 monitors state from API server 302 and communicates with network agent 222 to receive network information. Pod VM controller 216 communicates with image service 218 to provision container image storage for pod VM 130. Pod VM controller 216 communicates with pod VM 130 to configure pod VM 130 and control pod VM agent 212. Operations in FIGS. 7B-7D described below can be understood with reference to the components in FIG. 7A.

As shown in FIG. 7B, a method 700 can be performed by VI control plane 113 and orchestration control plane 115, which comprise software executing on CPU, memory, storage, and network resources managed by a virtualization layer (e.g., a hypervisor) and/or host operating system. Method 700 begins at step 702, where a user provides a pod specification to API server 302 to create a new pod. At step 704, scheduler 304 selects candidate nodes for deployment of the pod. Scheduler 304 selects the candidate nodes by filtering on affinity, node selector constraints, etc. At step 706, scheduler extender 306 cooperates with resource scheduler 108 in VM management server 116 to select a node from the set of candidate nodes. Resource scheduler 108 selects zero or one node from the list of a plurality of candidate nodes provided by scheduler extender 306.

At step 708, scheduler 304 converts the pod specification to a VM specification for a pod VM 130. For example, scheduler 304 converts CPU and memory requests and limits from pod specification to VM specification with fallback to reasonable defaults. The VM specification includes a vNIC device attached to the logical network used by pod VMs 130. The guest OS in VM specification is specified to be kernel 210 with container engine 208. Storage is an ephemeral virtual disk.

At step 710, PLC 324 invokes VM management server 116 to deploy pod VM 130 to a host 120 corresponding to the selected node. At step 712, VM management server 116 cooperates with host daemon 214 in host 120 corresponding to the selected node to create and power-on pod VM 130.

As shown in FIG. 7C, a method 714 can be performed by VI control plane 113 and orchestration control plane 115, which comprise software executing on CPU, memory, storage, and network resources managed by a virtualization layer (e.g., a hypervisor) and/or host operating system. Method 714 begins at step 716, where pod VM controller 216 cooperates with network agent 222 to obtain a network identify for pod VM 130. At step 718, network agent 222 reserves a logical port on a logical switch for pod VM 130. At step 720, pod VM controller 216 cooperates with image service 218 to obtain container images for pod VM. At step 722, pod VM controller 216 configures the vNIC of pod VM 130 with the network identity obtained from network agent 222. At step 724, pod VM controller 216 cooperates with host daemon 214 to attach disks having the container images. At step 726, pod VM controller 216 configures pod VM 130 and starts pod VM agent 212. For example, pod VM controller 216 configures networking (e.g., IP address, routing, domain name service (DNS), etc.) of pod VM 130. Pod VM controller 216 configures root directories for containers (e.g., overlay ephemeral storage over images). Pod VM controller 216 configures swap storage and sysctl as required by pod specification.

As shown in FIG. 7D, a method 728 can be performed by pod agent 212, which comprises software executing on CPU, memory, storage, and network resources managed by a virtualization layer (e.g., a hypervisor). Method 728 begins at step 730, where pod VM agent 212 first starts init containers of containers 206. At step 732, pod VM agent 212 starts liveness and readiness probes for containers 206. At step 734, pod VM agent 212 starts the remaining containers 206. At step 736, pod VM agent provides status of containers 206 to pod VM controller 216.

In host 120, there are two important functions with respect to container lifecycle management that require state to be stored about the result and control decisions made—the management of init containers and restart policy. Init containers need to be invoked in a particular order before any of the main containers in pod VM 130 can be started. If any init container fails, the whole pod VM 130 enters a FAILED state. Assuming the init containers have all started successfully, pod VM agent 212 starts the remaining containers in pod VM 130. Once these containers are running, the control plane needs to monitor their state such that if one stops for any reason, the exit code is logged and a decision made as to whether to restart the container and what delay may be desirable (crash loop back-off). If all the containers exit and are not restarted, the whole pod VM 130 will enter COMPLETED state.

In an embodiment, a state machine is provided that manages the container lifecycle, logs the state transitions, and ensures that when necessary, container state transitions turn into pod state transitions. This state machine can be disposed in either pod VM agent 212 or pod VM controller 216. In an embodiment, container lifecycle management is centralized in pod VM controller 216 and pod agent 212 simply executes instructions and reports back results. In another embodiment, the pod VM agent 212 is more autonomous and manages container lifecycle from inside pod VM 130. This has the significant advantage that in the case where pod VM controller 216 is unavailable because of upgrade or downtime, pod VMs 130 continue to ensure availability of containers 206. This simplifies control protocol between pod VM controller 216 and pod VM agent 212 and allows for a more modular approach to the implementation. Pod VM controller 216 still queries pod VM agent 212 for container state and report such container state back to Kubernetes master 104, but pod VM controller 216 does not need to cache the state.

In embodiments, pod VM agent 212 also has responsibility for managing liveness and readiness probes. The probes can be hypertext transfer protocol (HTTP), socket-based, or process-based, and are tests that are run on a regular cadence to determine whether pod VM 130 is either ready or still live. There are benefits to having these tests run in the same address space as the running pod—the fact that there is no need for an external network connection to the pod, the fact that process lifecycle doesn't need to be managed remotely. However, if pod VM agent 212 fails for some reason, but the containers its managing are still live, the liveness checks will not be executed and pod VM 130 may be deemed to have died even though its services are live. This however goes beyond just a consideration of liveness checks—if pod VM agent 212 dies and fails to restart, pod VM 130 should be considered to have failed.

Figure 8:
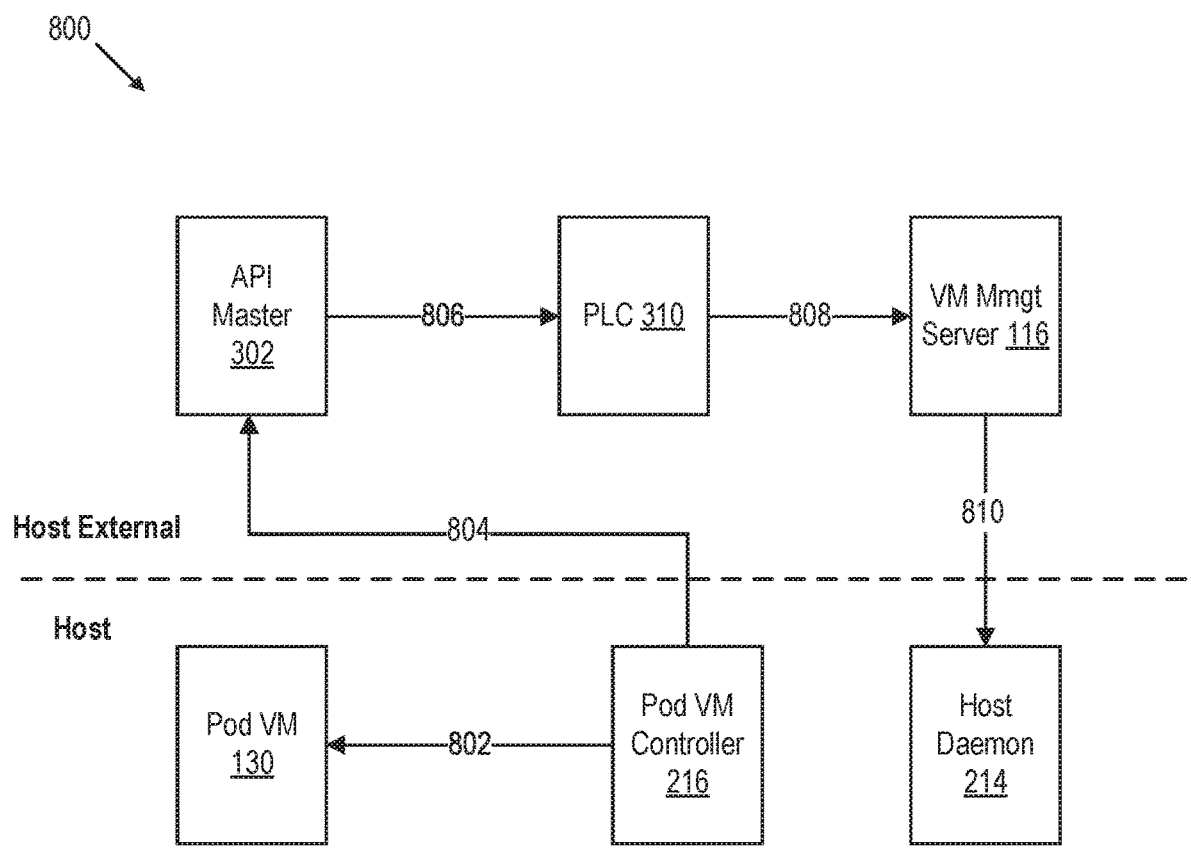
FIG. 8 is a block diagram depicting a method of destroying a pod VM according to an embodiment.

FIG. 8 is a block diagram depicting a method 800 of destroying a pod VM 130 according to an embodiment. Method 800 can be performed by VI control plane 113 and orchestration control plane 115, which comprise software executing on CPU, memory, storage, and network resources managed by a virtualization layer (e.g., a hypervisor) and/or host operating system. At step 802, pod VM controller 216 determines that pod VM agent 212 has exited. For example, pod VM agent 212 can report pod VM state as succeeded or failed. In such case, at step 804, pod VM controller 216 reports the status back to API server 302 in supervisor Kubernetes master 104. Alternatively, a state change in supervisor Kubernetes master 104 may indicate that the pod VM should be shut down. At step 806, PLC 324 notices the state has been changed and that the pod VM should be destroyed. At step 808, PLC 324 issues a request to destroy the pod VM to VM management server 116. At step 810, VM management server 116 instructs host daemon 214 to destroy the pod VM. Host daemon 214 powers off the pod VM if needed. Host daemon 214 also removes ephemeral storage for the pod VM. Host daemon 214 also cleans up any other on-disk state for the pod VM.

Figure 9:
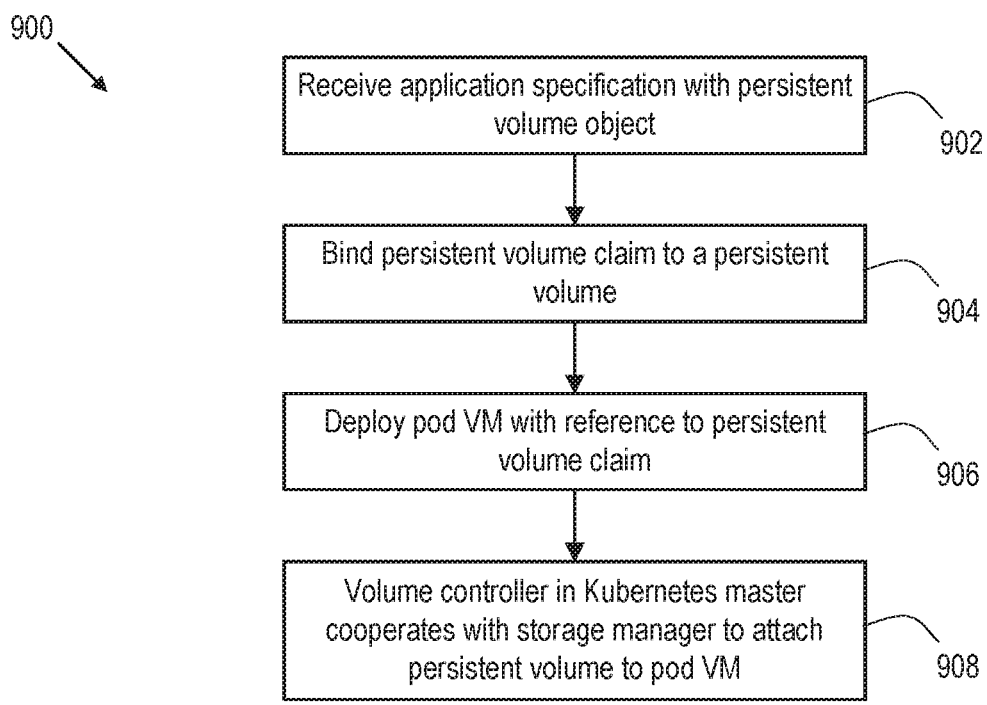
FIG. 9 is a flow diagram depicting a method of deploying a persistent volume for a pod VM according to an example.

FIG. 9 is a flow diagram depicting a method 900 of deploying a persistent volume for a pod VM according to an example. Method 900 can be performed by VI control plane 113 and orchestration control plane 115, which comprise software executing on CPU, memory, storage, and network resources managed by a virtualization layer (e.g., a hypervisor) and/or host operating system. Method 900 begins at step 902, where supervisor Kubernetes master 104 receives an application specification having a persistent storage object defined therein. At step 904, supervisor Kubernetes master 104 cooperates with storage manager 110 to bind a persistent volume claim (PVC) to a persistent volume in shared storage 170. At step 906, supervisor Kubernetes master 104 cooperates with VM management server 116 and hypervisor 150 to deploy pod VM 130 in a manner described above with respect to FIGS. 7A-7D. Pod VM 130 is deployed with reference to the PVC. At step 908, storage plugin 316 in supervisor Kubernetes master 104 cooperates with storage manager 110 to attach the persistent volume in shared storage 170 to pod VM 130. Storage manager 110 is configured to wait for pod VM 130 to be fully deployed before attaching the persistent volume to pod VM 130.

Figure 10:
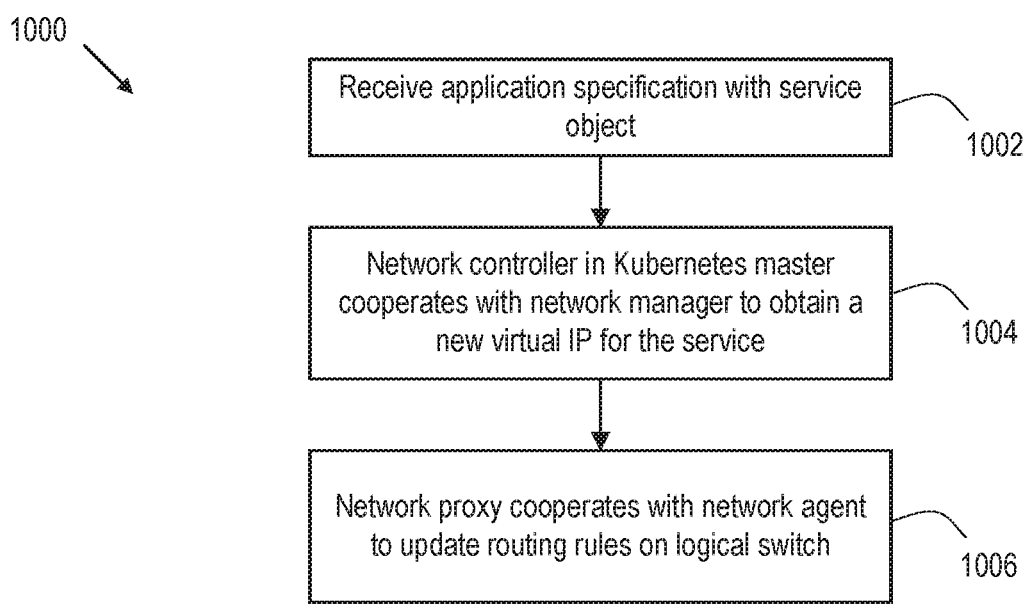
FIG. 10 is a flow diagram depicting a method of deploying a service in a supervisor cluster according to an example.

FIG. 10 is a flow diagram depicting a method 1000 of deploying a service in supervisor cluster 101 according to an example. Method 900 can be performed by VI control plane 113 and orchestration control plane 115, which comprise software executing on CPU, memory, storage, and network resources managed by a virtualization layer (e.g., a hypervisor) and/or host operating system. Method 1000 begins at step 1002, where supervisor Kubernetes master 104 receives an application specification having a service object defined therein. The service is implemented by container(s) in a pod VM 130. At step 1004, network plugin 312 in supervisor Kubernetes master 104 cooperates with network manager 112 to obtain a new virtual IP address for the service. At step 1006, network proxy 220 in hypervisor 150 cooperates with network agent 222 to update routing rules on the logical switch implemented by hypervisor 150. This allows traffic addressed to the virtual IP address to be routed to container(s) implementing the service.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
   a host cluster having hypervisors being bare metal hypervisors directly executing on hardware platforms of hosts, each hypervisor supporting execution of virtual machines (VMs), the VMs including pod VMs, the pod VMs including container engines supporting execution of containers in the pod VMs;
   an orchestration control plane integrated with each hypervisor, the orchestration control plane including a master server and pod VM controllers, the pod VM controllers installed and executing in the hypervisors external to the VMs, the pod VM controllers configured as agents of the master server to manage the pod VMs; and
   pod VM agents, executing in the pod VMs, configured as agents of the pod VM controllers to manage the containers executing in the pod VMs.

2. The virtualized computing system of claim 1, wherein the VMs include native VMs having guest operating systems executing therein, the guest operating systems isolated from the pod VM controllers.

3. The virtualized computing system of claim 1, further comprising a VM management server, wherein the master server includes an application programming interface (API) server and a scheduler, and wherein:
   the API server is configured to create pods in response to specification data;
   the scheduler is configured to select candidate hosts of the host cluster on which to schedule the pods and to provide the candidate hosts to the VM management server; and
   the VM management server is configured to select one or more of the candidate hosts on which to deploy the pods.

4. The virtualized computing system of claim 3, wherein the master sever includes a controller, and wherein:
   the scheduler is configured to convert specifications of the pods into VM specifications; and
   the controller is configured to cooperate with the VM management server to deploy the pod VMs having the VM specifications.

5. The virtualized computing system of claim 1, further comprising:
   a virtual infrastructure (VI) control plane having a network manager configured to manage software-defined (SD) networking for the host cluster and network agents, in the hypervisors, configured to cooperate with the network manager.

6. The virtualized computing system of claim 5, wherein the pod VM controllers are configured to:
communicate with the network agents in the hypervisors to obtain network configurations for the pod VMs;
communicate with image services in the hypervisors to obtain container images for the pod VMs; and
start the pod VM agents.

7. The virtualized computing system of claim 1, wherein the pod VM agents are configured to:
start the containers; and
report status of the containers to the pod VM controllers.

8. A host computer in a host cluster of a virtualized computing system, the host comprising:
a hardware platform;
a hypervisor, being a bare metal hypervisor directly executing on the hardware platform, supporting execution of virtual machines (VMs), the VMs including pod VMs, the pod VMs including container engines supporting execution of containers in the pod VMs;
a pod VM controller, installed in and executing in the hypervisor external to the VMs, configured as an agent of an orchestration control plane of the virtualized computing system, the pod VM controller configured to manage the pod VMs; and
pod VM agents, executing in the pod VMs, configured as agents of the pod VM controller to manage the containers executing in the pod VMs.

9. The host computer of claim 8, wherein the pod VMs includes kernels, wherein the container engines and the pod VM agents execute on the kernels, and wherein the containers share the kernels of the pod VMs.

10. The host computer of claim 8, wherein the VMs include native VMs having guest operating systems executing therein, the guest operating systems isolated from the pod VM controller.

11. The host computer of claim 8, wherein the virtualized computing system includes a virtual infrastructure (VI) control plane having a network manager configured to manage software-defined (SD) networking for the host cluster, and wherein the pod VM controller is configured to:
communicate with a network agent in the hypervisor to obtain network configurations for the pod VMs from the network manager;
communicate with an image service in the hypervisor to obtain container images for the pod VMs; and
start the pod VM agents.

12. The host computer system of claim 8, wherein the pod VM agents are configured to:
start the containers; and
report status of the containers to the pod VM controller.

13. The host computer of claim 8, wherein the hypervisor includes a virtual switch, and wherein virtual network interface cards (vNICs) of the pod VMs are coupled to one or more logical networks implemented by the virtual switch.

14. The host computer of claim 13, wherein the pod VM controller is coupled to a master server of the orchestration control plane through the virtual switch.

15. A method of container orchestration in a virtualized computing system including a host cluster having hypervisors being bare metal hypervisors directly executing on hardware platforms of hosts, the hypervisors supporting execution of virtual machines (VMs), the hypervisors including pod VM controllers of an orchestration control plane installed and executing therein external to the VMs, the method comprising:
receiving, at a master server of the orchestration control plane, specification data for an application, the master server in communication with the pod VM controllers; and
deploying, based on the specification data, pod VMs the VMs, the pod VMs executing on the hypervisors and within one or more of the hosts, the pod VMs including container engines supporting execution of containers in the pod VMs, the pod VMs executing pod VM agents configured as agents of the pod VM controllers to manage the containers executing in the pod VMs.

16. The method of claim 15, wherein the step of deploying comprises:
creating, at an application programming interface (API) server of the master server, pods in response to the specification data;
selecting, by a scheduler of the master server, candidate hosts of the host cluster on which to schedule the pods;
providing the candidate hosts from the scheduler to a VM management server of a virtual infrastructure (VI) control plane of the virtualized computing system; and
selecting, by the VM management server, the one or more hosts from the candidate hosts.

17. The method of claim 16, wherein the step of deploying further comprises:
converting, by the scheduler, specifications of the pods into VM specifications; and
requesting, by a controller in the master server, the VM management server to deploy the pod VMs having the VM specifications.

18. The method of claim 15, further comprising:
deploying, based on the specification data, a native VM of the VMs, the native VM executing on the hypervisors and including a guest operating system executing therein that is isolated from the pod VM controllers.

19. The method of claim 15, further comprising:
provisioning, based on the specification data, a persistent volume in shared storage accessible by the host cluster, the persistent volume being attached to a first pod VM of the pod VMs.

20. The method of claim 15, wherein the pod VMs include kernels, wherein the container engines and the pod VM agents execute on the kernels, and wherein the containers share the kernels of the pod VMs.

* * * * *